(12) United States Patent
McMillan

(10) Patent No.: US 9,427,849 B2
(45) Date of Patent: Aug. 30, 2016

(54) ADJUSTABLE WORKPIECE REPAIR AND BUILDUP STAND

(71) Applicant: Edward B McMillan, Brooks, GA (US)

(72) Inventor: Edward B McMillan, Brooks, GA (US)

(*) Notice: Subject to any disclaimer, the term of this patent is extended or adjusted under 35 U.S.C. 154(b) by 123 days.

(21) Appl. No.: 14/530,710

(22) Filed: Nov. 1, 2014

(65) Prior Publication Data
US 2016/0121460 A1    May 5, 2016

(51) Int. Cl.
| | |
|---|---|
| B25B 5/16 | (2006.01) |
| F16M 11/00 | (2006.01) |
| B05B 13/02 | (2006.01) |
| A47F 5/10 | (2006.01) |
| B25H 1/16 | (2006.01) |
| A47B 3/02 | (2006.01) |
| B25H 1/02 | (2006.01) |

(52) U.S. Cl.
CPC . B25B 5/16 (2013.01); A47B 3/02 (2013.01); A47F 5/10 (2013.01); B05B 13/0285 (2013.01); B25H 1/02 (2013.01); B25H 1/16 (2013.01); F16M 11/00 (2013.01)

(58) Field of Classification Search
CPC ........... A47B 3/02; A47B 45/00; A47F 5/00; A47F 5/10; F16M 11/00; F16M 11/38; F16M 11/26; F16M 2200/06; F16M 2200/061; B25H 1/02; B25H 1/04; B25H 1/16; B25H 1/10; B05B 13/0285
See application file for complete search history.

(56) References Cited

U.S. PATENT DOCUMENTS

| | | | | |
|---|---|---|---|---|
| 2,468,547 A | * | 4/1949 | Duhmert | A47C 4/283 248/157 |
| 3,994,400 A | * | 11/1976 | Graber | B62H 3/04 211/200 |
| 4,029,318 A | * | 6/1977 | Boss | F41J 1/10 108/118 |
| 4,268,020 A | * | 5/1981 | Wood | B25H 1/0007 269/166 |
| 4,404,838 A | * | 9/1983 | Hare | B21D 1/14 72/457 |
| 4,714,224 A | * | 12/1987 | Calmes | A47B 97/08 108/10 |
| 4,745,791 A | | 5/1988 | Fish | |
| 4,804,162 A | * | 2/1989 | Rice | B25H 1/0007 248/129 |
| 4,901,989 A | * | 2/1990 | Stellato | B25H 1/00 269/17 |
| 5,296,030 A | * | 3/1994 | Young | B05B 13/0285 118/500 |

(Continued)

Primary Examiner — Joseph J Hail
Assistant Examiner — Tyrone V Hall, Jr.
(74) Attorney, Agent, or Firm — J. T. Hollin, Attorney at Law, P.C.

(57) ABSTRACT

The device disclosed comprises two major components: a fold-out stand and an adjustable repair and build-up stand. The adjustable repair and build-up stand is horizontally attached to the undersurfaces of the horizontal members of the fold-out stand, thereby minimizing workspace required in a typical auto body repair shop or other repair facility. A technician may clamp a workpiece to adjustable telescoping arms or a pair of swing arms, all integral to the repair and build-up stand, therefore enabling the stabilization and positioning required for repair of a damaged part or installation of necessary components to a part. Other shop work may be performed atop the fold-out stand since the repair and build-up stand is permanently located underneath the fold-out stand.

2 Claims, 7 Drawing Sheets

(56) References Cited

U.S. PATENT DOCUMENTS

| | | | | |
|---|---|---|---|---|
| 5,407,171 | A * | 4/1995 | Gonzalez | F24F 13/32 248/670 |
| 5,707,450 | A * | 1/1998 | Thompson | B05B 13/0285 118/500 |
| 5,915,742 | A * | 6/1999 | Hung | B25B 11/02 269/17 |
| 5,934,641 | A * | 8/1999 | Vince | A47D 9/005 248/165 |
| 6,240,987 | B1 * | 6/2001 | Birkeland | B25H 1/04 108/69 |
| 6,443,321 | B1 * | 9/2002 | Felsenthal | A47B 43/00 211/195 |
| 6,640,595 | B2 | 11/2003 | Sundgren et al. | |
| 6,837,934 | B1 * | 1/2005 | Patrykus | B05B 13/0285 118/500 |
| 7,168,685 | B2 | 1/2007 | Miner | |
| 7,287,410 | B2 | 10/2007 | King | |
| 7,431,257 | B1 * | 10/2008 | Davis | B05B 13/0285 108/118 |
| 7,448,606 | B1 * | 11/2008 | Johnson | B05B 13/0285 269/16 |
| 7,988,137 | B2 * | 8/2011 | Johnson | B25H 1/0007 248/164 |
| 8,074,484 | B2 | 12/2011 | Denkmeier et al. | |
| 8,297,595 | B2 | 10/2012 | Shen et al. | |
| 8,328,173 | B1 * | 12/2012 | DesForge | B25H 1/0007 248/176.1 |
| 8,528,379 | B2 | 9/2013 | Williamson | |
| 2007/0022950 | A1 * | 2/2007 | Livingston | B05B 13/0285 118/500 |
| 2008/0067300 | A1 * | 3/2008 | Liu | B25H 1/04 248/166 |
| 2012/0242022 | A1 * | 9/2012 | Gagnon, Jr. | B25H 1/0007 269/9 |

\* cited by examiner

ADJUSTABLE WORKPIECE REPAIR AND BUILDUP STAND

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concept disclosed is an adjustable support platform for mechanical components and parts which typically require repair work at automobile body shops and other industrial facilities where work similar work is performed.

The device herein, termed an Adjustable Workpiece Repair & Buildup Stand, is based on the consideration that automobile body repair shops in most countries have one thing in common, being they all have at least one fold-out work stand in the shop. The typical fold out-stand is a very stable work platform and is a useful tool, particularly for repair of automotive hoods, fenders, and bumpers. However, a major drawback of these fold-out work stands is their inability to securely and efficiently hold a plastic or fiberglass bumper cover.

The Adjustable Workpiece Repair & Buildup Stand essentially brings the fold-out stand to a new level of usefulness. The Repair and Buildup Stand 1 portion of the device mounts underneath the horizontal members of a fold-out stand, which means that an auto repair shop, for instance, does not have an unnecessary item of equipment occupying the limited floor space. The device also provides more efficient shop operation in that, should a workpiece that needs no clamping or secure tie-down, be placed atop the fold-out stand, the Adjustable Workpiece Repair & Buildup Stand is clear of the work space needed by a repairman performing a work task atop the fold-out stand.

(2) Description of the Related Art, including information disclosed under 37 CFR 1.97 and 1.98.

U.S. Pat. No. 8,528,379 82 (Nov. 10, 2013; An apparatus and method for applying tension to flexible items, including wire, barbed wire, cable, or rope, are described herein. A stationary clamping member is fixedly attached to a first end of a guide bar, extending outwardly therefrom, while a non-stationary clamping member is movably mounted to and extending outward from the guide bar substantially parallel to the stationary clamping member. The free end of a first flexible item is secured in the stationary clamping member, while the free end of a second flexible item is secured in the non-stationary clamping member. A tensioning assembly, such as a ratchet-like assembly engaging notches in the guide bar, is used to move the non-stationary clamping member away from the stationary clamping member, thereby tensioning one or both flexible items. Once the flexible items have been tensioned, they can be twisted together to form a connection without losing tension.

U.S. Pat. No. 8,297,595 An adjustable hydraulic horizontal jack including a frame, a hydraulic unit, a jib unit, link rods, and a handle. Here, the structures of the jib and the link rod(s) are improved according to an embodiment. With the improved structures, the jack has rational structures and can act reliably. In addition, under the parameters equivalent to those of conventional hydraulic horizontal jacks, the jack of an embodiment of the present invention can change the height of the lowest position and the load by adjusting the length of the jib and link rods. Therefore, the jack is adapted to jacking up not only a light automobile with a low chassis but also a heavy automobile with a high chassis, thus having a wider scope of application.

U.S. Pat. No. 8,074,484 The invention relates to a manipulation device (3) for manipulating a workpiece (4) on a bending press (2), comprising, multiple successive moving elements (17), in particular articulated arms (18), connected to one another via articulated joints (19), wherein one moving element (22) has a rotary head (23) which is rotatable about a rotational axis (24) which at least approximately coincides with a center axis (25) of the moving element (22), and comprising a gripping device (27) connected thereto having a gripping zone (34), formed by one or more gripping elements (32), by means of which the workpiece (4) may be held. According to the invention, the gripping device (27) is connected to the rotary head (23) via a boom element (26), by means of which a midpoint (35) of the gripping zone (34) is situated at a distance (36)from the rotational axis (24), and by means of an adjustment device (40) on the boom element (26) the position and/or angular orientation of the gripping device (27) and the gripping zone (34) with respect to the boom element (26) may be adjusted in at least two different working positions.

U.S. Pat. No. 7,287,410 (Oct. 30, 2007) An automobile body repair machine incorporating a quill and shaft load shouldering assembly whose quill includes lateral, medial, and oppositely lateral sections; slide stopping set screws extending through the quill sections for impingement upon the quill and shaft combination's shaft; weld seam grasping left and right anchor clamps fixedly attached to the lateral and oppositely lateral quill sections; a pull force transferring cantilevered stem; a selectively lockable and unlockable pivot joint interconnecting the stem and the medial quill section; a pivoting cantilevered foot attached to a distal end of the stem; and a foot extending hydraulic cylinder triangulating between the stem and the foot; the automobile body repairing machine further incorporating a body damage pulling tie attached to a distal end of the cantilevered foot.

U.S. Pat. No. 7,168,685 (Jan. 30, 2007) An improved vehicle jack and jack stand is provided, used separately or in combination, where the both the vehicle jack and jack stand are adapted to receive and support a cup means that also supports a block. The block is able to be interchanged with other blocks to accommodate virtually any type of vehicle. A single jack is able to be used with multiple jack stands, since each jack stand is able to provide support at the identical location as the jack does. This is extremely useful on vehicles with uni-body construction. The jack stand defines an adjustable head, where the head is able to fit between side members of the jack stand, so that both the jack and jack stand are able to be concurrently positioned beneath the cup and block means. The jack stand also provides a removable cross support, which allows the jack stand to be moved in or out of position while the jack is being used to elevate an automobile. The support is replaced prior to the time that the vehicle is lowered onto the jack stand.

U.S. Pat. No. 6,640,595 (Nov. 4, 2003) in a method and apparatus (1,31) for forming a three-dimensional object and in particular to a method and apparatus (1,31) for forming a three-dimensional beam, it is desirable to form three-dimensional beams (5) having complex forms by using an efficient forming process for the beams which may be incorporated into existing high volume production techniques. The apparatus (1,31) for forming three-dimensional beams (5) comprises a support device and an actuation device. Support members (2, 32, 41, 51, 61) spaced about the longitudinal axis of the support device locally define an opening (4, 35, 43, 53, 63) for supporting a section of the beam (5). The position of adjacent openings (4, 35, 43, 53, 63) relative to one another defines the overall form of the beam (5) and the actuation device defines the position of each opening (4, 35, 43, 53, 63).

U.S. Pat. No. 4,745,791 (May 24, 1988) Apparatus for repairing and straightening a vehicle frame of an automobile including a rigid base frame having cantilevered beams to receive vehicle clamps adjustable thereon, the base frame being expansible and compressible within the wheel base and tread of a vehicle to be repaired and the beams extending beyond the sides of such vehicle—a jack adaptor, clamp modifiers and a link chain shortener being cooperable with the cantilevered beams.

BRIEF SUMMARY OF THE INVENTION

The device disclosed comprises two major components: a repair and buildup stand 1 and a fold-out stand 2, wherein the repair and buildup stand 1 is horizontally clamped and bolted to the underside of the horizontal members of the fold-out stand 2.

The complete device disclosed herein, termed an Adjustable Workpiece Repair & Buildup Stand, is based on the premise that probably every automobile body repair shop in this country has one thing in common, being they all have at least one fold-out work stand in the shop. The typical fold out-stand is a very stable work platform and is a useful tool, particularly for repair of automotive hoods, fenders, hoods, and bumpers. However, a major drawback of these fold-out work stands is their inability to securely and efficiently hold a plastic or fiberglass bumper cover in place while a technician performs necessary repairs.

The Adjustable Workpiece Repair & Buildup Stand essentially brings the fold-out stand to a new level of usefulness. The repair and buildup stand portion of the device mounts underneath the horizontal members of a fold-out stand, which means that an auto repair shop, for instance, does not have another item of equipment occupying their limited floor space. This also provides more efficient shop operation in that, should a workpiece that needs no clamping be placed atop the fold-out stand, the Repair and Buildup Stand 1 itself is out of the way.

The Repair and Buildup Stand 1 is vertically adjustable, by using two lengths of chain to adjust the floor-contacting members of the fold-out stand to a desired height. The repair & buildup stand comprises sliding brackets to allow the Repair and Buildup Stand 1 to travel up or down as the height of the fold-out stand is varied. Further, if a technician needs a different height that the chain lengths allow, the repair & buildup stand is capable of maintaining the fold-out stand at any height by means of let and right slide brackets, which once tightened to the inner surfaces of the fold-out stand, maintain the fold-out stand at the desired height, without the inconvenience of manipulating the chain lengths.

The Repair and Buildup Stand 1 can be lowered to allow the technician to be seated and work on a desired part. The Repair and Buildup Stand is not limited to plastic or fiberglass bumpers, but may also be utilized to work on steel bumpers or any other workpieces which may consist of a variety of materials.

The Repair and Buildup Stand 1 addresses two persistent problems which particularly confront auto body repair technicians. The first of these problems is the fact that plastic bumper covers are extremely hard to control during any repair process. Plastic bumpers are extremely flexible especially when they are torn in an accident. The Repair and Buildup Stand 1 allows the technician to position and securely hold the bumper cover in any position that will provide the most effective handling of the repair process. The inventive concept provides a means for the technician to place pressure on the bumper cover and force it back into its normal shape. This procedure is required where a bumper cover is torn in an accident and loses its shape integrity. When this happens, the technician will clamp the bumper cover to the Repair and Buildup Stand 1 and actually use the telescoping arms, or the swing arms, to either pull the bumper cover back together or spread it open, depending on the adjustment needed. No other known Repair and Buildup Stand 1 can accomplish this feat in as practically an unlimited arrangement of repair positions as does the Repair and Buildup Stand 1 disclosed. In the past, the only means of accomplishing this type of repair was for the technician to obtain help from a co-worker, which in turn, interferes with the work of the co-worker, and slows down production of the shop.

The second of the problems mentioned above is that after a bumper cover has been repaired, reshaped, and painted, it must be returned to the technician for what is called the "buildup." The buildup is the process whereby the technician places the bumper cover, most likely on a fold-out stand, and reinserts various smaller parts and components of the bumper cover before the final reattachment of the bumper cover to its corresponding vehicle. These components may include such items as fog lamps, air dams, grilles, energy absorbers, sensors, and other parts.

The crux of this problem is that one the bumper cover is placed on a typical fold-out stand it must be placed in a "face down" position so that the inside of the bumper cover is facing up and the painted side is facing down. The face of a bumper cover, in almost all cases, is not flat, but generally comprises a rounded shape of varying angles and curvatures. This renders it almost impossible to maintain the bumper cover in an effective repair position, since the fold-out stand has an essentially flat upper surface. Oftentimes, the bumper cover may become unbalanced and roll off the fold-out stand onto the floor, causing new damage, a paint-touchup requirement or other adverse results.

The disclosed Repair and Buildup Stand 1 is the only device available which will securely a bumper cover during the buildup repair phase so as to allow easy access to the inside of the bumper cover and also allow the bumper cover to be securely held in place without any parts of the Repair and Buildup Stand 1 presenting obstacles or obstructing access to the workpiece by the technician. The Repair and Buildup Stand 1 can also be used to secure heavy steel truck bumpers in the same manner.

DETAILED DESCRIPTION OF THE INVENTION

The objects, features, and advantages of the concept presented in this application are more readily understood when referring to the accompanying drawings. The drawings, totaling seven figures, show the basic components and functions of embodiments and/or methods of use. In the several figures, like reference numbers are used in each figure to correspond to the same component as may be depicted in other figures.

Repair and Buildup Stand 1 in the Storage Position

The description of this inventive concept can best be understood by reference to the accompanying drawing figures, totaling seven in number. In viewing FIG. 1, the Repair and Buildup Stand 1 is shown in its "storage" position. All adjustable hand knobs contained in the device have threaded stems and corresponding threaded apertures into which the knobs are designed to be threadingly inserted.

Figure 2:
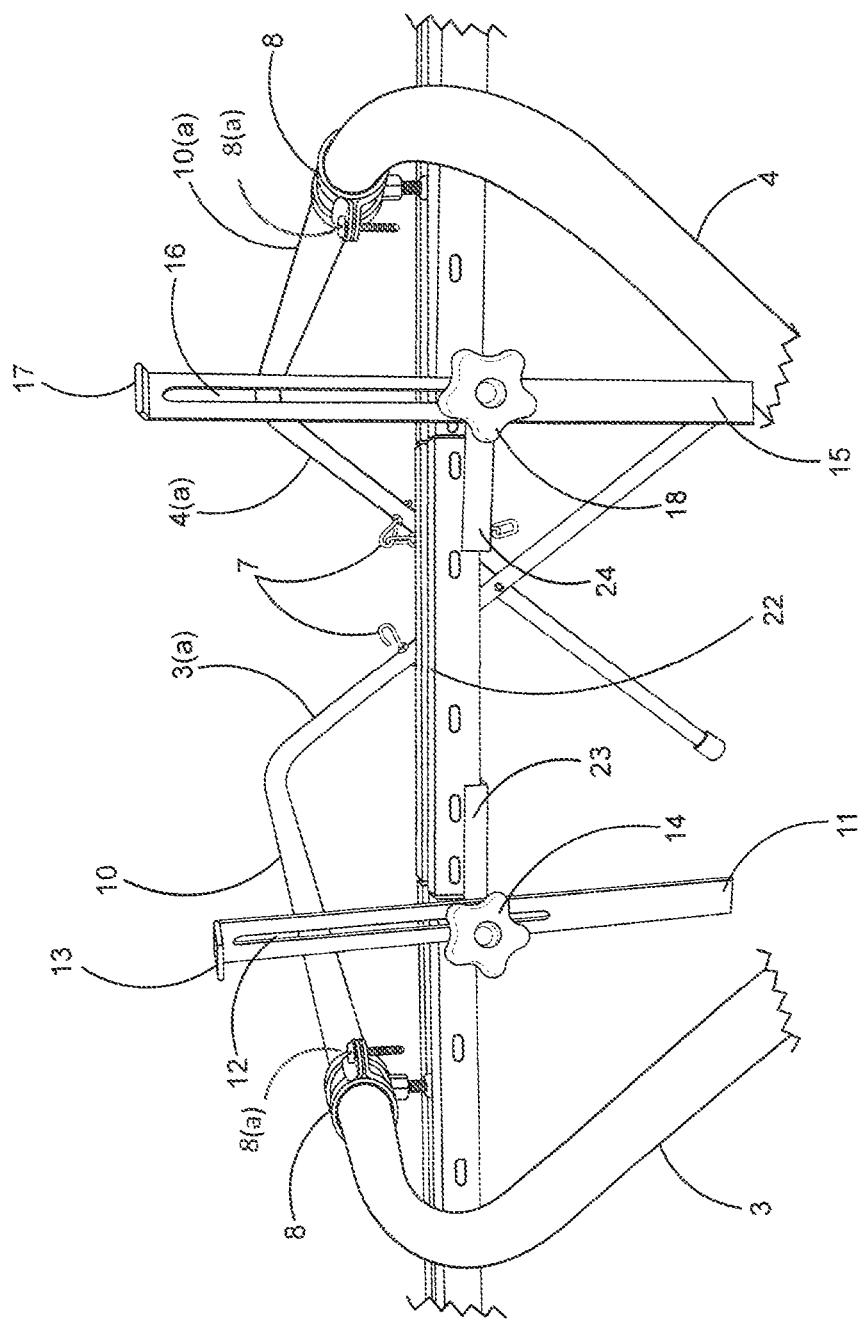
FIG. 2 illustrates a close-up view of the horizontal slide rail 22, two clamps 8 and attached studs which support, the slide rail and the extension of both the left and right clamping ledges 11, 15 which clamping ledges are used to support an automobile bumper in a "face-up" position.

The Repair and Buildup Stand 1 may generally be supported underneath the horizontal segments of a fold-out stand 2 by two metallic clamps 8, each clamp baying a downwardly-projecting stud which serves to connect each respective clamp 8 to a left slide bracket 25 (not visible) and a right slide bracket 26 (not visible) of the Repair and Buildup Stand 1. Both slide brackets 25, 26, may slide freely within a rectangular cross-sectioned horizontal slide rail 22. FIG. 2 illustrates adjusting screws 8(a) that are used to loosen the clamps 8 in order to maintain verticality of the clamp-stud 8 and allow parallel movement of both slide brackets 25, 26. The left slide bracket 25 is more clearly visible in FIG. 5, which also shows a clamp 8 attached to the left cross-member 10 of the fold-out stand 2. The right slide bracket 26 is similarly attached to the right slide-bracket 26 and cross-member 10(a) of the fold-out stand 2.

Figure 1:
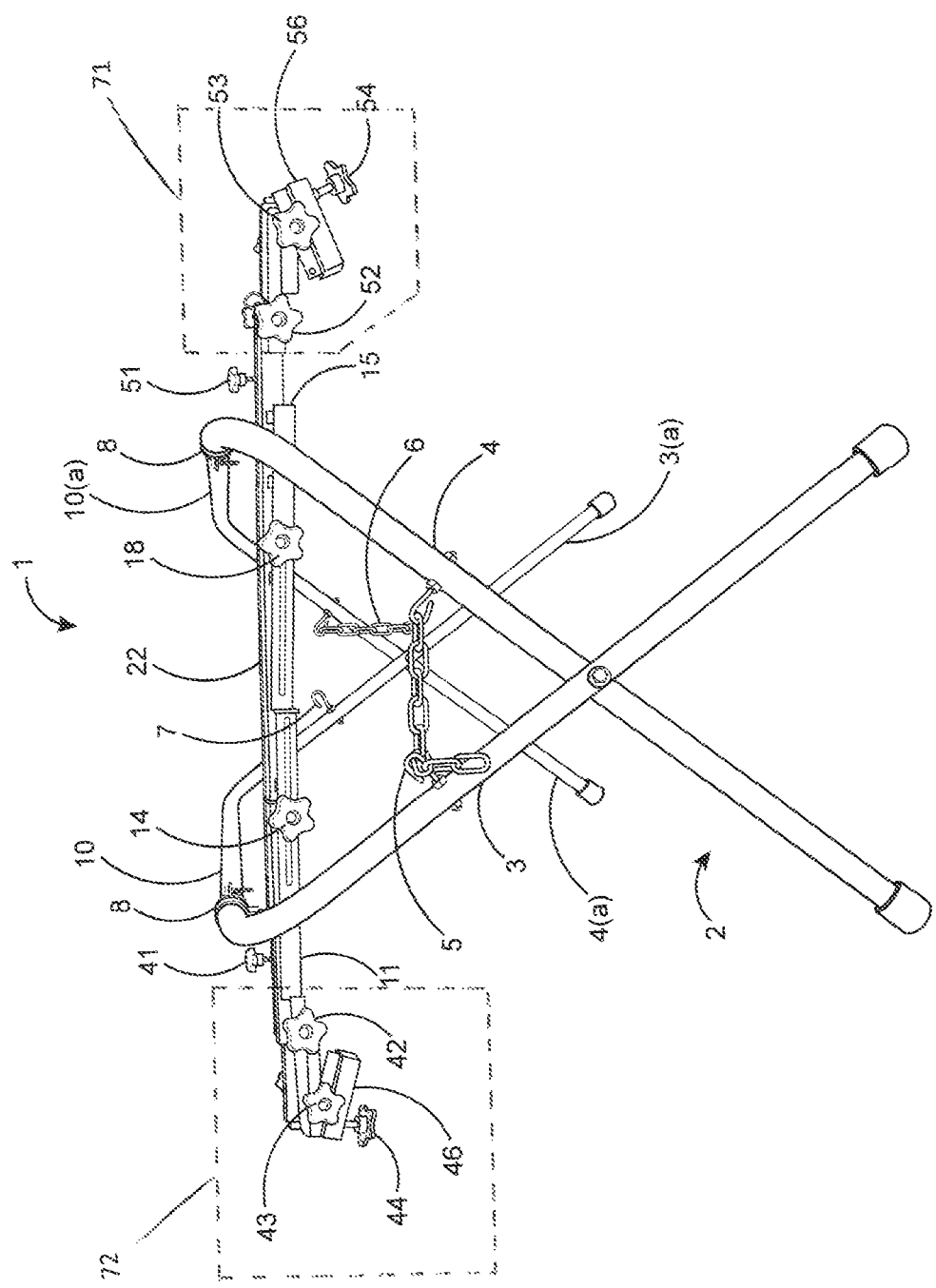
FIG. 1 is a view, from an operator's perspective, of the front of the inventive concept showing the folding platform 2 supporting the horizontal slide rail 22 and the corresponding left and right assemblies 72, 71 of the repair and buildup stand 1.

As shown in FIG. 1, the fold-out stand 2 comprises a front left member 3 and a rear left member 3(a), a front right member 4 and a rear right member 4(a). The two left members 3, 3(a) are integrally connected by a left cross-member 10. Likewise, the two right members 4, 4(a) are integrally connected by a right cross-member 10(a). In the embodiment shown in FIG. 1, two lengths of chain 5, 6 may be fastened to respective hooks 7, the hooks 7 serving as fastening points to adjust the length of the chains 5, 6. As the chain 5, 6 lengths are adjusted, the height of the fold-out stand 2 is thus varied above the floor or other surface upon which the fold-out stand 2 is placed.

Figure 5:
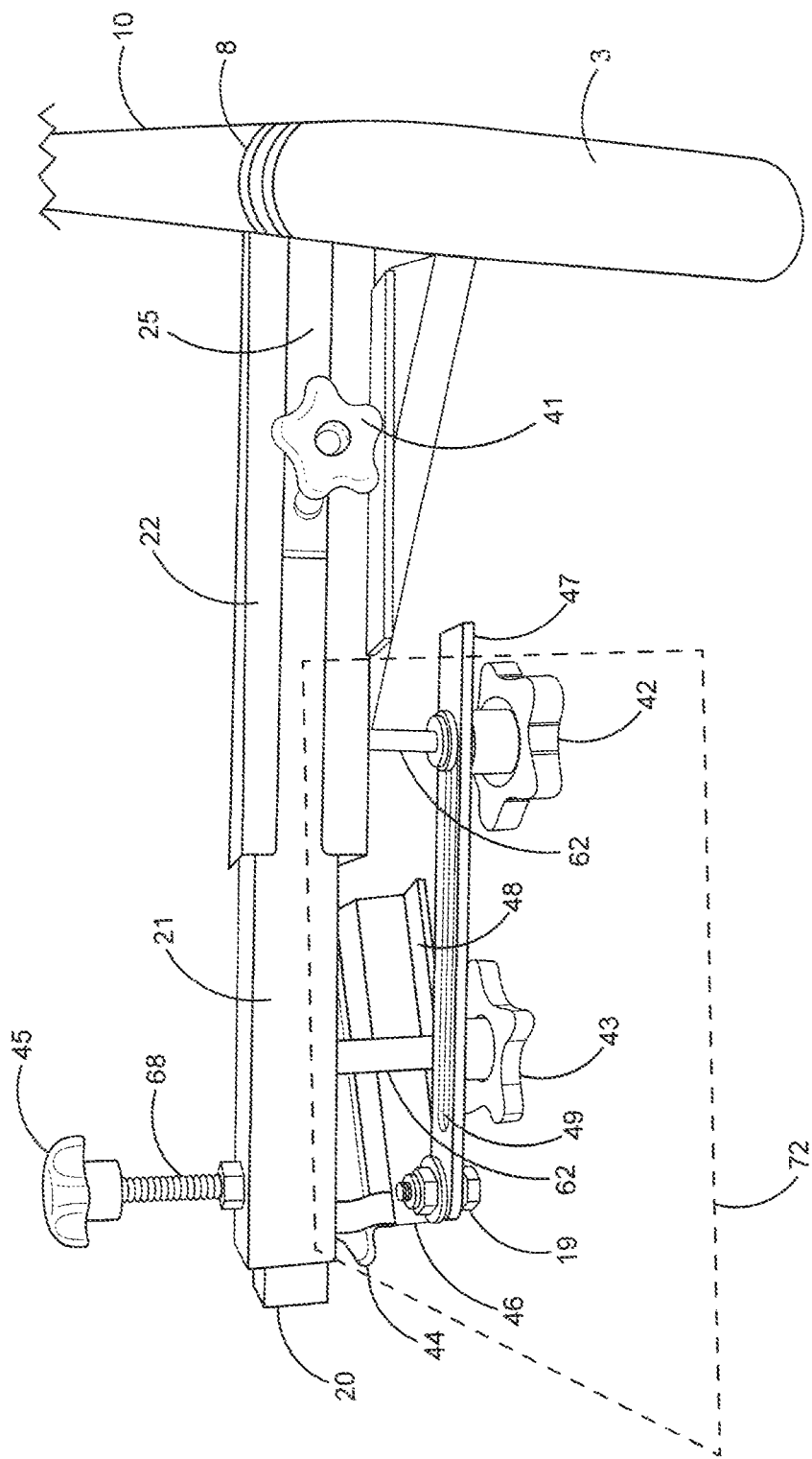
FIG. 5 shows a downward-looking view of the components of the left assembly 72, the components being depicted in a "storage" position with the left telescoping arm 20 retracted in a horizontal orientation within the right arm housing 21.

This enables a technician to more easily access the surface of any workpiece which may be secured to the Repair and Buildup Stand 1. The height of the entire device may also be adjusted by loosening both adjusting screws 8(a), as shown in FIG. 2, thereby allowing both sliding brackets 25, 26, horizontally within the slide rail 22. The left and right slide bracket hand knobs 41, 51 must also be loosened and then re-tightened to provide a friction clamp of the sliding brackets 25, 26 within the interior of the sliding rail 22. Each slide bracket 25, 26 contains a threaded aperture (not shown) which accepts the threaded slide bracket hand knobs 41, 51. FIG. 5 provides a more detailed view of the components of the left side of the device in making the vertical adjustment required.

Key components of the Repair and Buildup Stand 1 are left and right swivel arms 46, 56, respectively, as shown in FIG. 1. In the storage position, both the left swivel arm 46, and right swivel arm 56 are shown locked in the down position. In this position, both swivel arms 46, 47 are at the limit of their horizontal positioning ranges. Neither the left swivel arm 46 nor the right swivel arm 56 can be manipulated any lower than the storage position. A left exterior adjusting knob 43 and a right exterior adjusting knob 53 are used to securely hold the left and right swivel arms 46, 56, respectively, in their locked, down storage positions.

To illustrate the storage position of the Repair and Buildup Stand 1, reference is made to FIG. 5, which presents the left side of the Repair and Buildup Stand 1 in the storage position. As shown in FIG. 5, a horizontal slide-rail 22 is used as a guide by which the entirety of the Repair and Buildup Stand 1 is aligned in the storage position. A hollow, rectangular cross-sectioned left telescoping arm housing 21 is contained within the horizontal slide rail 22. The left telescoping arm 20, having a rectangular cross section corresponding to the left telescoping arm 20 (partially in view) is pushed into the left housing 21 as far as it will go. The left interior hand knob 45 is then tightened to hold the left telescoping arm 20 in that position. The horizontal slide rail 22 also extends to the right side of the Repair and Buildup Stand 1 where similarly, a right telescoping arm housing 31 is contained within the horizontal slide rail 22.

Figure 6:
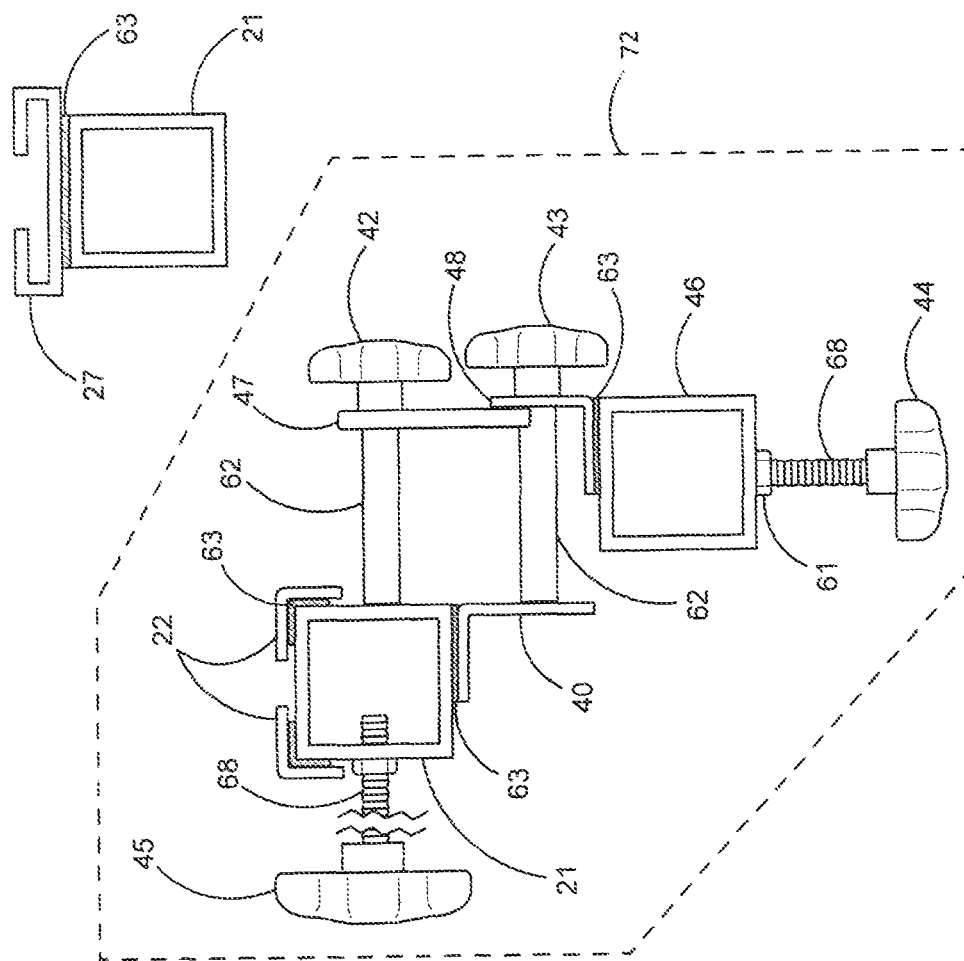
FIG. 6 presents a view of the left assembly 71, and more particularly, the view is from the perspective of looking parallel to, and along the longitudinal center line of both the left telescoping arm housing 21 and the hollow left swivel arm 46 with the left telescoping arm 20 having been removed.

Likewise, with the device in the storage position, a right swivel arm 56 is locked in the down position. In this position, the right swivel arm 56 is at the limit of its horizontal positioning range and cannot be manipulated any lower than the storage position. The right telescoping arm 30 (out of view) is pushed into the right housing 31 as far as it will go and the right interior hand knob 55 (out of view) is tightened to retain the right telescoping arm 30 in the storage position An additional depiction of the mechanical components involved in the locked down storage position is presented in FIG. 6, which depicts essentially a view of the left end of the Repair and Buildup Stand 1. As shown in FIG. 6, the left swivel arm 46 is attached, along its length, by a weld 63 joint to a left angle bracket 48. The left angle bracket 48 contains an aperture to accommodate a threaded left exterior adjusting knob 43. The threaded portion (enclosed b a sleeve 62) of the left exterior adjusting knob 43 is freely moveable lengthwise within the confines of the sleeve 62. The sleeve 62 is attached to a left angle iron 40, which is welded 63 to the bottom of the left arm housing 21. The left angle iron 40 contains a threaded aperture which correspondingly accepts the threaded portion of the left exterior adjusting knob 43. When the left exterior adjusting knob 43 is aligned with the aperture in the left angle bracket 48, the sleeve 62, and the threaded aperture in the left angle iron 40, it is then tightened, resulting in securement of the swivel arm 46, in the locked down storage position.

Figure 3:
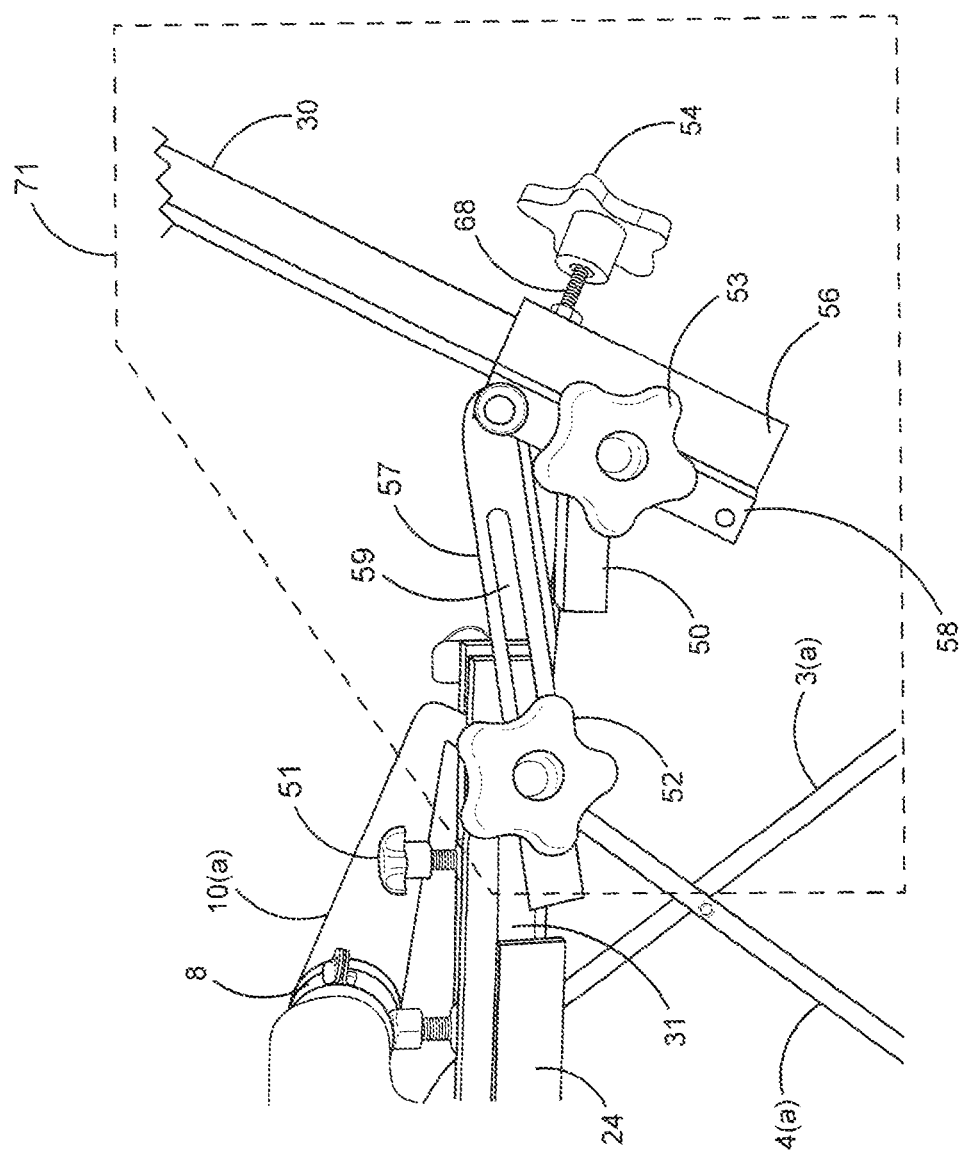
FIG. 3 depicts the major components of the right assembly 71, which components are appropriately adjusted to set the desired working support angle of the right telescoping arm 30.

In FIG. 6, the area enclosed by dashed lines represents the left assembly area 72 which encompasses those components of the Repair and Buildup Stand 1 necessary to manipulate the left side of the Repair and Buildup Stand 1 from the storage position to multiple support angles and extensions required to secure a workpiece. An equivalent mechanical arrangement exists on the right side of the Repair and Buildup Stand 1 whereby the right swivel arm 56 is maintained in, or released from, the locked down storage position. FIG. 3 illustrates those equivalent components included in the right assembly area 71 of the Repair and Buildup Stand 1

In referring again to FIG. 3, further details of the workings of the right side of the Repair and Buildup Stand 1 are illustrated, specifically those components included in the right assembly area 71. The right swivel arm 56 has been released from the locked down position and rotated counterclockwise to place the right swivel arm 56 in a position approximately 70 degrees relative to horizontal. A separate and independently moveable right telescoping arm 30 is shown inserted into the hollow right swivel arm 56. A threaded 68 right swivel arm adjustment knob 54 is tightened against the right telescoping arm 30, providing a secure and stable component for a technician. Similarly, the components of the left assembly 72 on the left side of the Repair and Buildup Stand 1 are manipulated to position the left telescoping arm 20.

In further description of the positioning of the right telescoping arm 30, a threaded right arm length adjusting knob 52 has been loosened to permit travel of a right slotted locking bracket 57 along a sleeve 62 (out of view) covering the threaded portion of the right arm length adjusting knob 52. The right slotted locking bracket 57 has been transversely along the sleeve 62 by means of a locking bracket slot 59. The right swivel arm 56 is then enabled to be positioned rightwardly in an extended horizontal position and also has rotated to an upward pointing orientation. The right swivel arm 56 is then secured by the threaded right exterior adjusting knob 53 being tightened into the right angle iron 50. The threaded portion of the right exterior adjusting knob 53 is then tightened to hold the right swivel arm 56 in the upward-oriented position by its passage through a right angle bracket 58 and into a threaded aperture provided on the right angle iron 50.

Figure 4:
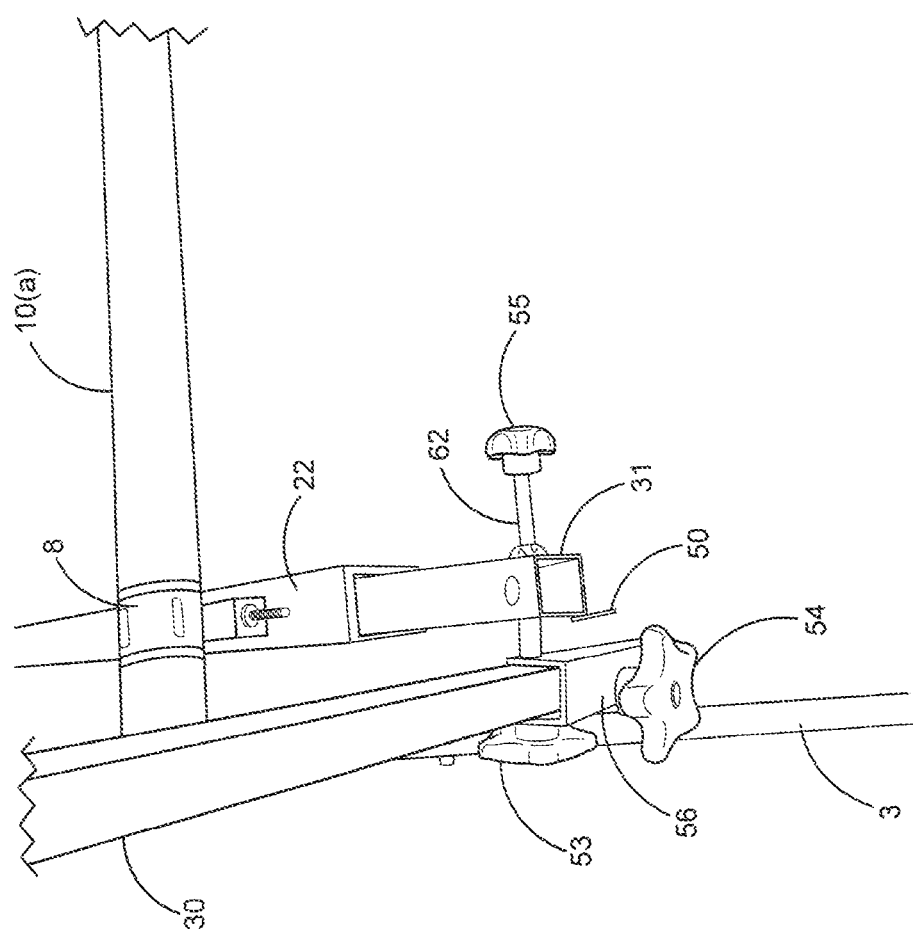
FIG. 4 is a downward-looking view of right assembly components which have been adjusted and arranged to set the right telescoping arm 30 at an upward vertical angle relative to the horizon, the right swivel arm adjustment knob 54 having been tightened to hold the telescoping arm 30 in place.

Additional illustration of the manipulation of the right telescoping arm 30 by the components of the right assembly 71 is depicted in FIG. 4.

Initiating Repair on a Workpiece

At the time of initiating a repair operation on an automobile bumper 69 or other object (referred to as the "workpiece") a repair person must engage in a sequence for positioning and adjusting the telescoping arms 20, 30. For the purposes of clarity and by way of convenience only, the "workpiece" will be presented in this disclosure as an automobile bumper 69. FIG. 5 will serve to illustrate the relevant components involved. Should a technician initiate set up of the Repair and Buildup Stand 1, by beginning on the left side of the Repair and Buildup Stand 1, the first step is to loosen a left interior hand knob 45. In this manner the end of the left telescoping arm 20 may be grasped and freely pulled out the desired length. The left interior hand knob 45 is then tightened to secure the left telescoping arm 20. Similarly, the next step is to loosen right interior hand knob 55. This enables the grasping of the end of the right telescoping arm 30 and freely pulling out the desired length. The length of exposure of the left telescoping arm 20 and the right telescoping arm 30 is determined by the size of the bumper 69 or part that needs to be supported on the Repair and Buildup Stand 1.

The most efficient and safest practice is to ensure that the workpiece will normally rest equally on both the extended left telescoping arm 20 and the extended right telescoping area 30. If a vehicle bumper 69 is the workpiece, then it can rest right side up (bumper 69 resting with face up on stand). For informational purposes, the "face" of a bumper 69 is the exterior surface that shows in the factory-installed position on an automobile, as it would sit on the vehicle, or it can be rotated 180 degrees longitudinally on the Repair and Buildup Stand, thus making it easier to do any repairs needed.

Repair and Buildup Stand 1 in the "Face-Down" or "Build-up" Position

Figure 7:
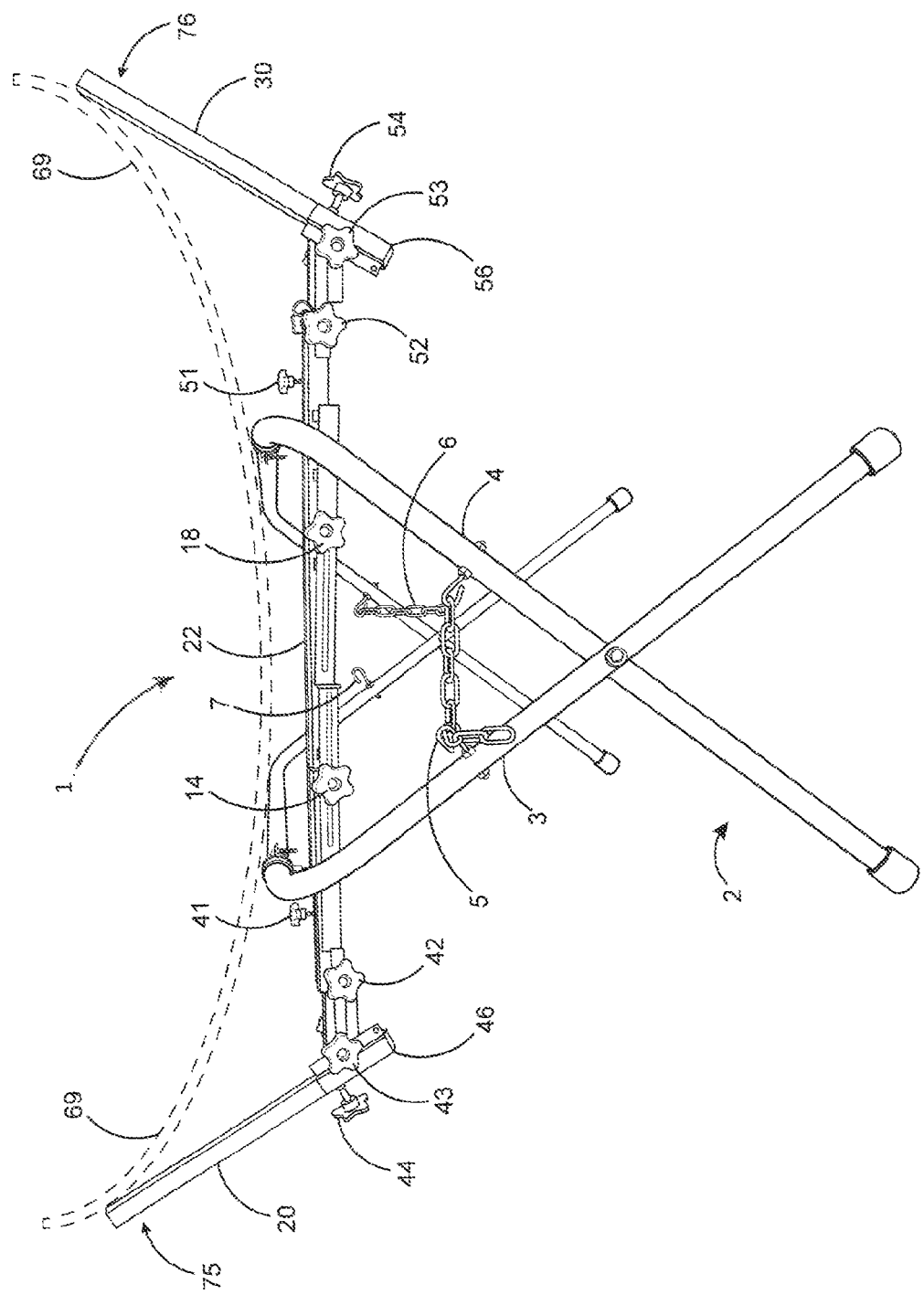
FIG. 7 is a view of the Repair and Buildup Stand 1 and folding platform 2 having a stylized automobile bumper 69 in place for repair operations, the bumper positioned "face-down" between the left telescoping arm 20 and the right telescoping arm 30.

In the event repairs are needed on the interior surface of an automotive bumper 69, the following are the sequential steps for putting the Repair and Buildup Stand 1 in what will be called the "buildup" position (bumper 69 resting with face down on the Repair and Buildup Stand 1). The "Build-up" position is depicted in FIG. 7. The buildup position can be used to install parts in a ready-to-be-assembled bumper 69. This position of the Repair and Buildup Stand 1 can also be used to affect repairs to a damaged bumper 69.

Reference will be made to FIG. 5 in describing the build-up position. A grouping of components of the Repair and Buildup Stand 1 is contained within the dashed lines, and will be referred to as the "left assembly" 72. The first step is for the operator of the Repair and Buildup Stand 1 to loosen the left interior hand knob 45. This allows the operator to grasp the left telescoping arm 20 and remove it from the left arm housing 21. Next, the left telescoping arm 20 is placed in the hollow section of the left swivel arm 46. At this time the operator must tighten the left arm length adjusting knob 44. The next step is to loosen both the left exterior adjusting knob 43 and left swivel arm angle adjuster knob 42. The operator then rotates the entire left assembly 72 to the angular position that will best allow the bumper 69 to be damped in place.

Continuing with reference to FIG. 5, the operator then tightens the left exterior adjusting knob 43 and the left swivel arm angle adjuster 42. If the length of the telescoping arm 20 needs to be adjusted further, the operator must loosen the left arm length adjusting knob 44 and slide the left telescoping arm 20 outward from the left swivel arm 46 to the desired length. Then, the previous step of tightening the left arm length adjusting knob 44 is repeated.

The right side of the Repair and Buildup Stand 1 is then arranged, in the same corresponding sequence the left side, so as to complete the buildup position. The right side of the Repair and Buildup Stand 1 also comprises a grouping of components within a "right assembly" 71, which is shown more clearly in FIG. 3.

Once the left and right sides of the Repair and Buildup Stand 1 are adjusted and placed in the proper angle for bumper 69 repair work, the bumper 69 is placed in the open area between the telescoping arms 20, 30. The bumper 69 is then clamped in place by the operator's use of two or more hand-held spring clamps. At least two spring clamps are normally needed to secure the bumper 69 in place between the left telescoping arm 20 and the right telescoping arm 30. The spring clamps may be attached, simultaneously, to the bumper 69 and the telescoping arms 20, 30, at attachment points designated as 75 and 76, respectively, which are shown in FIG. 7.

It must he noted that the left swivel arm 46 and the right swivel arm 56 will rotate to any position within an approximately 170 degree arc, thereby allowing for repair of a wide range of bumper 69 lengths and curvatures. The left swivel arm 46 and the right swivel arm 56 may each be rotated approximately 170 degrees to cause either the left or the right telescoping arms 20, 30 to point downwards or upwards, for a total of 340 degrees of movement. In this manner a bumper 69 may he clamped in either a face-up or face-down position simply by having either telescoping arm 20, 30, point up 170 degrees or down 170 degrees.

Repair and Buildup Stand 1 in "Face-up" Position

In the event repairs are needed on the face, or exterior surface, of an automotive bumper 69, the following are the sequential steps for putting the Repair and Buildup Stand 1 in what will be called the "face-up" position (bumper 69 resting with the face displayed upward on the Repair and Buildup Stand 1).

In referring to FIG. 2, there are shown additional features of the Repair and Buildup Stand 1 which generally must be used in positioning an automobile bumper 69 face-up for repair work. An operator must utilize the left vertical clamping ledge 11 and the right vertical clamping ledge 15 as they are shown positioned in FIGS. 2. To attain this working position, the operator faces the approximate mid-point of the Repair and Buildup Stand 1 and loosen the left center locking hand knob 14 and the right center locking hand knob 18 by sequentially turning each knob 14, 18 in a counter-clockwise direction.

This loosening action enables the rotation of the left vertical clamping ledge 11 and the right vertical clamping ledge 15 from their stored horizontal positions (parallel to the slide rail 22) into vertical positions, as shown in FIG. 2. The height of both the left vertical clamping ledge 11 and the right vertical clamping ledge 15 are determined by the operator raising each vertical clamping ledge 11, 15, within the confines of an open space provided for in a left machined slot 12 and a right machined slot 16.

The left vertical clamping ledge 11 and the right vertical clamping ledge 15 must then be locked into their vertical positions by clockwise turning of both the left center locking hand knob 14 and the right center locking hand knob 18. It is also to be noted that a left flat clamping ledge 13 and a right fiat clamping ledge 17 are now positioned at the uppermost part of both the left vertical clamping ledge 11 and the right vertical clamping ledge 15, respectively. In this manner, the left flat clamping ledge 13 and the right flat clamping ledge 1 provide two points of support to the inner surface of an automobile bumper 69 that may be positioned face-up on the Repair and Buildup Stand 1.

In the event, the ends of a bumper 69 may need support in the face-up position, the right assembly 71 and/or the left assembly 72 may be manipulated to adjust either or both telescoping arms 20. 30. FIG. 5 will be used as the visual reference for description of the initial steps to arrive at the face-up position. The operator first loosens the left interior hand knob 45. Next, the left telescoping arm 20 is pulled out of the left arm housing 21. The operator then places the left telescoping arm 20 in the hollow section of the left swivel arm 46. The operator must next tighten the left arm length adjusting knob 44.

Continuing with reference to FIG. 5, the operator loosens both the left exterior adjusting knob 43 and the left swivel arm angle adjuster 42. Rotate the entire left assembly 72 upwards, causing the left telescoping arm 20 to reach the desired working angle to repair the bumper 69. In the face-up position, the bumper's 69 left and right ends are pointing downward. At this stage of preparation of the Repair and Buildup Stand 1, it is necessary for the operator to tighten both the left exterior adjusting knob 43 and the left swivel arm angle adjuster 42. The operator must loosen the left swivel arm length adjuster 44 and slide telescoping arm 20 through the left swivel arm hollow section 46 (downwards) to the desired length for best clamping position. The operator then retightens the left swivel arm length adjuster 44. As necessary, the operator may use hand-held spring clamps to fasten the bumper 69 to the respective telescoping arms 20, 30.

Returning to the Storage Position

Upon completion of the bumper 69 repair work, the bumper 69 is removed and the Repair and Buildup Stand 1 must be returned to its storage position, from either the bumper 69 face-down buildup/repair position or the bumper 69 repair face-up position. Starting on the left side of the Repair and Buildup Stand 1, the operator must loosen left exterior adjusting knob 43 (as shown in FIG. 1, FIG. 5, and FIG. 6) and the left swivel arm angle adjuster 42. Next the operator rotates the left swivel arm hollow section 46 to the most horizontal position it will reach. The operator then retightens both the left exterior adjusting knob 43 and the left swivel arm angle adjuster 42. This will hold the swivel arm hollow section 46 in place. At this point, the operator must loosen the left swivel arm length adjuster 44 and remove the left telescoping arm 20 from the left swivel arm hollow section 46. The left telescoping arm 20 is then inserted into the left arm housing 21, sliding the left telescoping arm 20 in as far as it will go. Next, the operator tightens the left interior hand knob 45 so as to hold the left telescoping arm 20 in place within the left arm housing 21.

Continuing the placement of the Repair and Buildup Stand 1 into its storage position, a similar process is conducted on the right side of the Repair and Buildup Stand 1 by utilizing the right exterior adjusting knob 53 and the right swivel arm angle adjuster 52 (as shown in FIG. 1, FIG. 3, and FIG. 4). The operator must loosen the right swivel arm length adjuster 54, and remove the right telescoping arm 30 from the right swivel arm hollow section 56. The right telescoping arm 30 is then inserted into the right arm housing 31, and pushed into the right telescoping arm housing 31 as far as it will go. After this action is performed, the right interior hand knob 55 is tightened to secure the right side of the Repair and Buildup Stand 1.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A portable, adjustable, and retractable repair and build-up stand for supporting and securely damping a workpiece, and to provide over one hundred seventy stable positions and orientations of said workpiece for access by a person performing repair operations or modifications on said workpiece, the retractable repair and build-up stand comprising (a) a fold-out stand and (b) a Repair and Buildup Stand 1, wherein said fold-out stand comprises an apparatus having two pivotally adjoined, inverted U-shaped legs, each leg defined by a horizontal cross-member having a clamp and attached bolt downward projecting affixed at the near end of said cross-member, a right member having a hook affixed thereto, and a left member having an affixed hook, further having a length of chain removably attachable to corresponding hooks on either right or left member; and further, where the height of said fold-out stand may be controlled by the crossing angle formed by adjusting the length of said chains fastened to the corresponding hooks, thereby allowing said cross-members of each respective U-shaped leg to draw nearer or be pushed further from each other, creating a range of heights for the fold-out stand;

said Repair and Buildup Stand 1 comprises a hollow, horizontal, rectangular cross-sectioned slide rail, a left slide bracket, a left slide bracket hand knob, a hollow, rectangular cross-sectioned left arm housing, a removable rectangular cross-sectioned left telescoping arm, a left interior tightening knob, a tell assembly, and a left clamp-bolt; further comprising a right slide bracket, a right slide bracket hand knob, a hollow, rectangular right arm housing, a removable, rectangular cross-sectioned right telescoping arm, a right interior tightening knob, a right assembly, whereby said left and right telescoping arms may be either stored within the respective arm housings, or slidingly positioned at a desired horizontal extension outside of the respective left or right arm housings, or positioned in a plurality of extended angular orientations by the components of the respective left assembly and right assembly;

a left assembly comprising a left slide bracket hand knob, a stem-threaded left interior tightening knob, a hollow, rectangular cross-sectioned left swivel arm welded to a left angle bracket, a stem-threaded left swivel arm adjustment knob, a left angle iron, a stem threaded left exterior adjusting knob, a left slotted locking bracket, a left locking bracket slot, and a left arm angle adjusting knob, wherein said left angle iron is welded to the bottom of the endmost section of said left arm housing, said left arm adjusting knob is threadingly tightened or loosened, through a first sleeve, to said horizontal rail, thereby allowing the left locking bracket slot of said left slotted locking bracket to move transverse to said first sleeve and thereby position the left angle bracket and the left swivel arm at various angles, and further, said left exterior adjusting knob being connected, through a threaded aperture, to said left angle bracket, so as to maintain said left angle bracket and its corresponding swivel arm in a stored position, or permit rotation of said left swivel arm into a plurality of angular positions, thus providing a plurality of positions of said removable left telescoping arm into said swivel arm, to be securely affixed within said left swivel arm by a tightening of the left swivel arm adjustment knob; and further, a right assembly comprising a right slide bracket hand knob, a stem-threaded right interior tightening knob, a hollow, rectangular cross-sectioned right swivel arm welded to a right angle bracket, a stem-threaded right swivel arm adjustment knob, a right angle iron, a stem threaded right exterior adjusting knob, a right slotted locking bracket, a right locking bracket slot, and a right arm angle adjusting knob, wherein said right angle iron is welded to the bottom of the endmost section of said right arm housing, said right arm adjusting knob is threadingly tightened or loosened, through a second sleeve, to said horizontal rail, thereby allowing the right locking bracket slot of said right slotted locking bracket to move transverse to said second sleeve and thereby position the right angle bracket and the right swivel arm at various angles, and further, said right exterior adjusting knob being connected, through an aperture, to said right angle bracket, so as to maintain said right angle bracket and its corresponding swivel arm in a stored position, or permit, rotation of said right swivel area into a plurality of angular positions of said removable right telescoping arm into said swivel arm, to be securely affixed within said right swivel arm by a tightening of the right swivel arm adjustment knob;

a left vertical clamping ledge having an integral left flat clamping ledge, rotatable and/or slidable by means of an internal left machined slot about the stem of a left center locking hand knob, said left center locking band knob insertable into a threaded aperture within a left L-bracket, said L-bracket welded horizontally onto the side of the horizontal slide rail; and a right vertical clamping ledge having an integral right flat clamping ledge, rotatable and/or slidable by means of an internal right machined slot about the stem of a right center locking hand knob, said right center locking hand knob insertable into a threaded aperture within a right L-bracket, said L-bracket welded horizontally onto the side of the horizontal slide rail.

2. A portable, adjustable, and retractable repair and build-up stand for supporting and securely clamping an automotive bumper or bumper cover, and to provide over one-hundred seventy stable positions and orientations of said bumper or bumper cover, either in a bumper "face_up" or a bumper "face-down" position, where the face of the bumper is defined as the exterior side of said bumper normally seen when attached to an automotive vehicle for access by a person performing repair operations or modifications on said bumper or bumper cover, the retractable repair and build-up stand comprising a (a) fold-out stand and (b) a Repair and buildup Stand 1, wherein said fold-out stand comprises an apparatus having two pivotally adjoined, inverted U-shaped legs, each leg defined by a horizontal cross-member having a clamp and attached bolt downward projecting affixed at the near end of said cross-member, a right member having a hook affixed thereto, and a left member having an affixed hook, further having a length of chain removably attachable to corresponding hooks on either right or left member; and further, where the height of said fold-out stand may be controlled by the crossing angle formed by adjusting the length of said chains fastened to the corresponding hooks, thereby allowing said cross-members of each respective U-shaped leg to draw nearer or be pushed further from each other, creating a range of heights for the fold-out stand;

said Repair and Buildup Stand 1 comprises a hollow, horizontal, rectangular cross-sectioned slide rail, a left slide bracket, a left slide bracket hand knob, to hollow, rectangular cross-sectioned left arm housing, a removable rectangular cross-sectioned left telescoping arm, a left interior tightening knob, a left assembly, and a left clamp-bolt; further comprising a right slide bracket, a right slide bracket hand knob, a hollow, rectangular right arm housing, a removable, rectangular cross-sectioned right telescoping arm, a right interior tightening knob, a right assembly, whereby said left and right telescoping arms may be either stored within the respective arm housings, or slidingly positioned at a desired horizontal extension outside of the respective left or right arm housings, or positioned in a plurality of extended angular orientations by the components of the respective left assembly and right assembly;

a left assembly comprising a left slide bracket hand knob, a stem-threaded left interior tightening knob, a hollow, rectangular cross-sectioned left swivel arm welded to a left angle bracket, a stem-threaded left swivel arm adjustment knob, a left angle iron, a stem threaded left exterior adjusting knob, a left slotted locking bracket, a left locking bracket slot, and a left arm angle adjusting knob, wherein said left angle iron is welded to the bottom of the endmost section of said left arm housing, said left arm adjusting knob is threadingly tightened or loosened, through a first sleeve, to said horizontal rail, thereby allowing the left locking bracket slot of said left slotted locking bracket to move transverse to said first sleeve and thereby position the left angle bracket and the left swivel arm at various angles, and further, said left exterior adjusting knob being connected, through a threaded aperture, to said left angle bracket, so as to maintain said left angle bracket and its corresponding swivel arm in a stored position, or permit rotation of said left swivel arm into a plurality of angular positions, thus providing a plurality of positions of said removable left telescoping arm into said swivel arm, to be securely affixed within said left swivel arm by a tightening of the left swivel arm adjustment knob; and further, a right assembly comprising a right slide bracket hand knob, a stem-threaded right interior tightening knob, a hollow, rectangular cross-sectioned right swivel arm welded to a right angle bracket, a stem-threaded right swivel arm adjustment knob, a right angle iron, a stem threaded right exterior adjusting knob, a right slotted locking bracket, a right locking bracket slot, and a right arm angle adjusting knob, wherein said right angle iron is welded to the bottom of the endmost section of said right arm housing, said right arm adjusting knob is threadingly tightened or loosened, through a second sleeve, to said horizontal rail, thereby allowing the right locking bracket slot of said right slotted locking bracket to move transverse to said second sleeve and thereby position the right angle bracket and the right swivel arm at various angles, and further, said right exterior adjusting knob being connected, through an aperture, to said right angle bracket, so as to maintain said right angle bracket and its corresponding swivel arm in a stored position, or permit rotation of said right swivel arm into a plurality of angular positions of said removable right telescoping arm into said swivel arm, to be securely affixed within said right swivel arm by a tightening of the right swivel aim adjustment knob;

a left vertical clamping ledge having an integral left flat clamping ledge, rotatable and/or slidable by means of an internal left machined slot about the stem of a left center locking hand knob, said left center locking hand knob insertable into a threaded aperture within a left L-bracket, said L-bracket welded horizontally onto the side of the horizontal slide rail; and a right vertical clamping ledge having an integral right, flat clamping ledge, rotatable and/or slidable by means of an internal right machined slot about the stem of a right center locking hand knob, said right center locking hand knob insertable into a threaded aperture within a right L-bracket, said L-bracket welded horizontally onto the side of the horizontal slide rail.

whereby both said left vertical clamping ledge and right vertical clamping ledge may be rotated into a vertical orientation for the coordinated clamping of a bumper or bumper cover to the flat clamping ledges of said vertical clamping ledges.

\* \* \* \* \*